Feb. 17, 1970  C. V. DI CAMILLO  3,495,775
NUMERICAL CONTROL DEVICE
Filed Dec. 1, 1966  4 Sheets-Sheet 1

INVENTOR
CARMINE V. DiCAMILLO

BY *Horvitz, Rose + Greene*

ATTORNEYS

INVENTOR
CARMINE V. DiCAMILLO
ATTORNEY

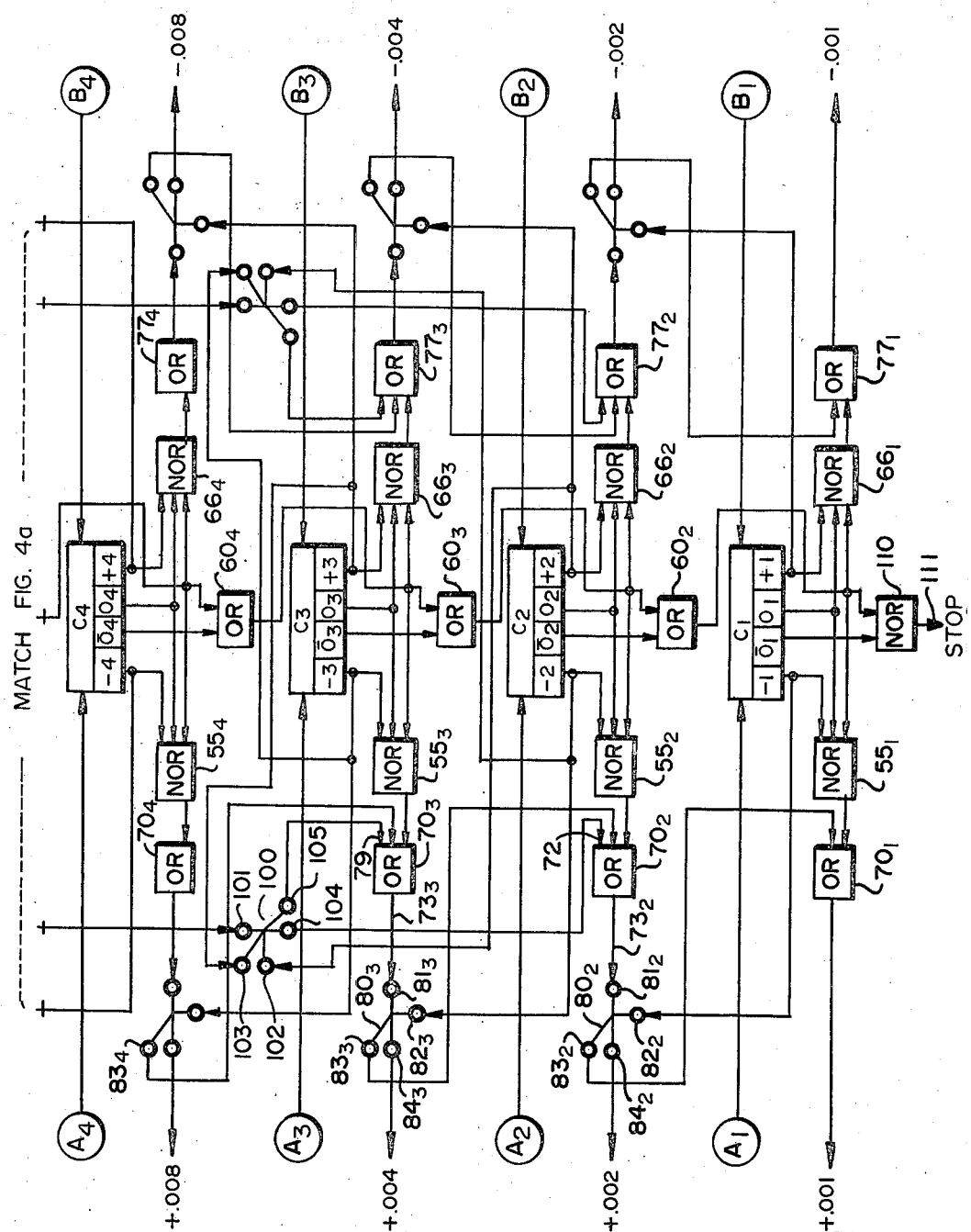

United States Patent Office 3,495,775
Patented Feb. 17, 1970

3,495,775
NUMERICAL CONTROL DEVICE
Carmine V. Di Camillo, Silver Spring, Md., assignor to
Bowles Engineering Corporation, Silver Spring, Md.,
a corporation of Maryland
Filed Dec. 1, 1966, Ser. No. 598,502
Int. Cl. G06d 1/00; G06m 1/00; G06f 15/46
U.S. Cl. 235—201
22 Claims

ABSTRACT OF THE DISCLOSURE

In a servomechanism for controlling the speed of a variable speed drive mechanism connected to a tool, a logic network for comparing command and position signals indicative of the instantaneous difference between the command and position signals. All bits in each signal being assigned different decimal equivalent weights. A bit-by-bit comparison is made wherein the highest order bit inequality between the command and position signals determines the polarity of this difference and is a measure of approximate error. A correction means in said logic network inhibits the approximate magnitude indication and provides for a modified approximate magnitude indication in accordance with the weight of a lower weighted pair of bits of said signals.

The present invention relates to digital logic networks, and particularly to such networks as are employed in digital systems to produce a control signal representative of the difference between two digital signals. Although the invention is described below as employed in a specific servomechanism utilizing digital techniques, particularly a numerically-controlled machine tool, it is to be understood that such description is illustrative only, and that the logic techniques disclosed herein are applicable to any system in which comparison of two numerical indicia is required.

Position-control systems, such as the type which may be used to automatically position machine tools, are well-known. Such systems generally employ a device or devices for producing a command signal indicative of the actual tool position, and a comparator for producing an error signal indicative of the instantaneous difference between the command and position signals. The error signal is employed to control the speed of a variable speed drive mechanism, such as a motor, which in turn controls the position of the machine tool. As the machine tool approaches the command position, the error signal necessarily decreases, thereby decreasing the speed of the drive mechanism, until eventually the tool achieves the desired position.

The inherent advantages of digital techniques, specifically accuracy and stability, have long been recognized as particularly applicable to position-control systems, and in fact, have found widespread utilization in this field. Specifically, a digital command signal and a digital position signal, when compared in a digital comparison device, enable stable position control of the machine tool with a degree of accuracy not readily attainable with analog type systems. However, the accuracy and stability achieved by such techniques have been at the sacrifice of simplicity and low cost. For example, assume that it is desired to position a machine tool with an accuracy of one one-thousandth of an inch over a twenty-four inch workbed. If a pure binary code is employed, a binary number having fifteen bits is required to represent all of the twenty-four thousand discrete tool positions. Thus, a fifteen bit command signal must be compared with a fifteen bit position signal to produce a fifteen bit error signal which must then be converted to analog form in a fifteen stage digital-to-analog converter device to produce a signal appropriate to control the speed of the motor or drive mechanism. Generally, the comparison of the digital signals is accomplished by some binary subtraction technique wherein complex subtraction and "borrow" circuits are employed, the "borrow" circuits being necessary to prevent signal reversal when the subtrahend exceeds the minuend in any comparison stage. In addition to requiring a large amount of circuitry, the "borrow" function is also time consuming, since the "borrow" status in the lower order stages must be resolved before the state of the difference signal in higher order stages can be finally determined. To further complicate these digital comparison and digital-to-analog conversion operations, many systems, in order to facilitate communication between a human programmer and the digital machine, employ Binary Coded Decimal (BCD) signals as opposed to pure binary signals. The BCD code is arrived at by taking each digit (decade) of a decimal number and translating it individually into binary form. Since there are ten possible values for each decade, a minimum of four binary stages is necessary to represent each decade. Not only does this require more stages than the pure binary code, thereby requiring additional logic circuitry, but the very nature of the BCD code makes it necessary to modify the BCD words so that they may be appropriately compared.

The present invention, in order to simplify the aforesaid comparison and error signal generation operations, is predicated upon making certain approximations insofar as system operation is concerned, which when utilized do not result in any reduction in positioning accuracy. These approximations will be discussed in detail below.

In order to explain the underlying theory of operation of this invention, reference is made to a specific system having stipulated parameter characteristics. Such a system is merely intended to be illustrative and not limiting on the scope of applicability of the techniques described. It is assumed that a numerically-controlled machine tool positioning system employs BCD signals of five decades (5×4 or 20 binary stages) for both the command signal, A, and the position signal, B. Let it be further assumed that each signal describes an absolute position; that is, a numerical position with respect to some arbitrary zero reference point, and that the command signal remains constant until the machine tool is positioned according to the command. From these conditions it is desirous to achieve a quick responding position control, having zero position overshoot, with a minimum amount of circuitry.

An examination of the requirements for the signal employed to control the speed of the tool positioning drive mechanism indicates that high speed positioning with zero overshoot can be readily achieved by using a multiple range speed drive wherein the speed of the drive mechanism decreases in discrete steps in accordance with predetermined ranges of decreasing distances of the machine tool from its commanded position. Suppose, for example, a maximum speed of 1200 inches per minute is dictated for large differences between command and position signals, that a small speed of 120 inches per minute is dictated for a contiguous range of somewhat smaller signal differences, that a 12 inch per minute speed is dictated for the next range of smaller signal differences, etc. This scheme provides the rapid response described for large differences of signal while having overshoot characteristics about the same as in the continuously variable speed type of system. In addition, this scheme eliminates the necessity of converting the digital difference between the command and position signals into a continuous analog error signal, and thereby requires only a relatively few speed command logic circuits. The logic circuits provide predetermined range-defining stages of the digital difference signal and do not require a conversion circuit associated with each stage of the signal. More importantly, however, this scheme permits elimination of the rigors of direct binary subtraction in favor of a pseudo-subtraction technique which results in only an approximation of the actual error. This approximation of the error signal is permissible since only the range of differences between the command and position signal is important as opposed to the actual instantaneous error as in prior art devices. As will be evident from the description which follows, the pseudo-subtraction technique is accomplished utilizing logic circuits which are less expensive and less complex than those required for direct subtraction or for prior art short cuts attempting to avoid such direct subtraction.

Next let us examine the nature of BCD command and position signals. Table 1 below lists the decimal weights assigned to each of the 20 binary stages ($A_1$ through $A_{20}$) in the BCD command signal word, and the weights assigned to each of the 20 binary stages ($B_1$ through $B_{20}$) in the BCD position signal word:

TABLE 1

Decimal values of non-zero A's and B's

| | |
|---|---|
| $A_1=00.001=B_1$ | $A_{11}=00.400=B_{11}$ |
| $A_2=00.002=B_2$ | $A_{12}=00.800=B_{12}$ |
| $A_3=00.004=B_3$ | $A_{13}=01.000=B_{13}$ |
| $A_4=00.008=B_4$ | $A_{14}=02.000=B_{14}$ |
| $A_5=00.010=B_5$ | $A_{15}=04.000=B_{15}$ |
| $A_6=00.020=B_6$ | $A_{16}=08.000=B_{16}$ |
| $A_7=00.040=B_7$ | $A_{17}=10.000=B_{17}$ |
| $A_8=00.080=B_8$ | $A_{18}=20.000=B_{18}$ |
| $A_9=00.100=B_9$ | $A_{19}=40.000=B_{19}$ |
| $A_{10}=00.200=B_{10}$ | $A_{20}=80.000=B_{20}$ |

It is to be noted that corresponding stages in the command signal A and the position signal B are assigned equal weights, and that these assigned weights increase with increasing stage number. Thus for either of signals A or B, if only stage 11 ($A_{11}$ or $B_{11}$) is in the binary one state, all other stages being in the binary zero state, the value of the respective signal is greater than when only state 10 ($A_{10}$ or $B_{10}$) is in the binary one state.

Next let us define the general stages $A_i$ and $B_i$ of the A and B signals respectively by:

$$A=\sum_{i=1}^{20}A_i;\quad B=\sum_{i=1}^{20}B_i.$$

If we consider the fact that the command signal A remains unchanged for each individual positioning cycle, we may then use the A signal as a reference when making the comparison between it and the varying position signal B. At this point let us examine the possibility of developing a signal comprising twenty independent stages defined as $C_i=A_i-B_i$ for the respective stages of signals A and B. That is, a direct stage by stage comparison is to be made irrespective of "borrowing" techniques and other stage interconnections associated with direct binary subtraction. From the truth table of Table 2 below we see each $C_i$ stage may assume one of three states in a three level code having a positive value for $A_i>B_i$, a negative value for $B_i>A_i$; and a zero value for $A_i=B_i$.

TABLE 2.—TRUTH TABLE

| $A_i$ | $B_i$ | $C_i$ |
|---|---|---|
| 0 | 0 | 0 |
| 1 | 0 | + |
| 1 | 1 | 0 |
| 0 | 1 | − |

Upon consideration of all twenty $C_i$ stages, it is noted that the highest order non-zero $C_i$ stage must always be of the same polarity as the polarity of the difference between signals A and B. This is true because $C_i$ is defined as the difference between $A_i$ and $B_i$, and thus the highest order non-zero $C_i$ corresponds to the highest order of A and B in which an inequality exists. Obviously, the highest order inequality between A and B determines the polarity of the difference between these signals.

Similarly, in addition to determining the polarity of the difference between A and B, the highest order non-zero $C_i$ stage provides an approximate measure of the magnitude of the difference between A and B. For example, if $C_{19}$ is + (i.e. $A_{19}=1$, $B_{19}=0$) and is the highest order non-zero $C_i$ stage at a particular instant of time, if we use $C_{19}$ as a measure of error magnitude, it is seen from Table 1 that the approximated error is +40.000 ($A_{19}=40.000$). However, just how close this approximated error magnitude is to the actual error magnitude depends upon the conditions in the lower order $C_i$ stages which immediately precede $C_{19}$. To illustrate this more clearly, consider the following example:

EXAMPLE 1

Let:
$C_{20}=0$ ($A_{20}=0$ binary 00.000 decimal; $B_{20}=0$ binary, 00.000 decimal).
$C_{19}=+$($A_{19}=1$ binary, 40.000 decimal; $B_{19}=0$ binary, 00.000 decimal).
$C_{18}=-$($A_{18}=0$ binary, 00.000 decimal; $B_{18}=1$ binary, 20.000 decimal).
$C_{17}=-$($A_{17}=0$ binary, 00.000 decimal; $B_{17}=1$ binary, 10.000 decimal).
$C_1$ through $C_{16}=0$, +, or − (thereby providing a maximum variation of ±09.999).

The actual error is clearly:

$$\begin{array}{r}+40.000\\-20.000\\-10.000\\\pm 09.999\\\hline +10.000\pm 09.999\end{array}$$

But according to our approximation using the highest non-zero $C_i$ stage as a measure of the error, our approximate error is +40.000. A scheme whereby +40.000 is used to approximate a range between +00.001 and +19.999 is clearly inadequate because of the size of the range and because the approximation lies outside the range.

Thus it apears that a corrective factor must be included in the error signal approximation to account for those situations when one or more of the lower order $C_i$ stages which immediately preceed the highest order non-zero $C_i$ stage are of a polarity different from the polarity of said highest order non-zero stage. If we consider the above example, we notice that if $C_1$ through $C_{16}$ are zero or +, then $C_{17}$, the lowest order stage of the unbroken sequence of $C_i$ stages preceeding and having an opposite polarity from the polarity of the highest order non-zero stage ($C_{19}$), provides a better approximate measure of the magnitude of the error signal (10.000). It would appear then that where the highest order non-zero $C_i$ stage is immediately preceeded by one or more of a consecutive chain of lower order stages having opposite polarity, that the lowest order stage of said chain might better be used as a measure of the magnitude of the error signal. The following examples illustrate this technique. To facilitate explanation, $C_m$ is defined as the highest order non-zero $C_i$ stage at any given instant of time.

EXAMPLE 2

Let:
$C_{20}=0$
$C_{19}=+$
$C_{18}=-$
$C_{17}=0$ or +
$C_1 \rightarrow C_{16}$ may be 0, +, or −.

Thus, $C_m=C_{19}$, and therefore the polarity of the error signal is +. Since $C_m$ is immediately preceeded by one stage ($C_{18}$) of opposite polarity, that stage is used to determine the magnitude of the error. Thus, $$|C|=|B_{18}|=|20.000|$$

The resulting approximated error is thus +20.000.
Computing the actual error using Table 1, it is seen that $$C_{19}=+40.000$$
$$C_{18}=-20.000$$
$$C_{17}=00.000 \text{ or } +10.000$$
$$C_1 \to C_{16}=\pm 09.999$$

Thereby yielding an actual error range of +10.001 to 39.999. The error of 20 obtained by use of stage $B_{18}=20$ is in the middle of the range.

EXAMPLE 3
Let:
$$C_{20}=-$$
$$C_{19}=+$$
$$C_{18}=+$$
$$C_{17}=+$$
$$C_{16}=0 \text{ or } -$$
$$C_1 \to C_{15}=0, +, \text{ or } -$$

Thus $C_m=C_{20}$, and the polarity of the error signal must be —. Since $C_m$ ($C_{20}$) is immediately preceeded by three stages of opposite polarity ($C_{17}$, $C_{18}$, $C_{19}$), the lowest order of these stages ($C_{17}$) is used to determine error magnitude. Thus, $$C=A_{17}=10.000$$

and the approximate error is —10.000.
Computing the actual error using Table 1, it is seen that $$C_{20}=-80.000$$
$$C_{19}=+40.000$$
$$C_{18}=+20.000$$
$$C_{17}=+10.000$$

$C_1 \to C_{16}$ must be between —09.999 and +07.999, thereby yielding an actual error range of —02.001 to —19.999 with acquired signal of 10 again lying in about the middle of the range.

From Examples 2 and 3 above, it is clear the corrective factor improves the accuracy of our approximation by first placing the approximated error within the actual error range, and second by keeping the approximation within one order of magnitude of the true error. For many purposes this is sufficiently accurate, and as will be illustrated subsequently, implementation of this corrective factor is rather straight forward and does not require complex circuitry.

There exists another problem with the approximation however, which results from the fact that a BCD code is employed. The theory employed in the above discussion, and the conclusion resulting therefrom, are as applicable to pure binary code as to 2BCD code. However, a peculiarity of the BCD code provides an additional problem in the error approximation to which consideration must be given. Since in BCD, four binary stages are employed to define each decade of an equivalent decimal number, each binary decade has a sixteen-bit capacity of which only ten bits are used. For example, only the numbers 0000 (decimal 0) through 1001 (decimal 9) may appear in each four stage BCD decade. Thus the numbers in the following list can never appear in any decade:

1010 (decimal 10)
1011 (decimal 11)
1100 (decimal 12)
1101 (decimal 13)
1110 (decimal 14)
1111 (decimal 15)

Instead, these decimal numbers appear in conjunction with the next higher four-stage binary decade such that:

0001 0000 represents decimal 10
0001 0001 represents decimal 11
0001 0010 represents decimal 12
0001 0011 represents decimal 13
0001 0100 represents decimal 14
0001 0101 represents decimal 15

It is this six-bit excess capacity in each decade which creates additional problems for the techniques thus far described. The problems may best be illustrated by a particular example:

EXAMPLE 4
Let:
$$C_m=C_5=+$$
$$C_4=-$$
$$C_3=0$$
$$C_2=0$$
$$C_1=+, -, \text{ or } 0$$

(Note that $C_5$, the lowest order stage in the second decade is the highest order non-zero $C_i$ stage, and that $C_4$, the next lowest stage and the highest order stage in the first decade, has an opposite sign.) Following the approximations developed above, the approximate error is found as follows:

The polarity of the error is the polarity of $C_m$ ($C_5$), thus +.
The magnitude of the error is determined by $C_4$ since $C_4$ ($C_{m-1}$) is the only immediately preceding $C_i$ stage of opposite sign to $C_5$ ($C_m$). Thus, $C_4=B_4=00.008$ and the approximate error is +00.008.
Computing the actual error, it is seen that $$C_5=+01.000$$
$$C_4=-08.000$$
$$C_1=00.000 \text{ or } \pm 00.001$$

and the actual error range is +00.001 to +00.003.
The approximated error lies outside the actual error range. Examining the regulationship between the assigned weights of contiguous stages within a decade, and comparing this to the relationship between the assigned weights of the highest order stage in a decade and the lowest order stage of the next higher decade, the reason for this problem becomes somewhat clearer. It is generally true that within any decade, the following relationship between stage weights exists:

$$\frac{\text{Weight of } Ai+1}{\text{Weight of } Ai}=2 \text{ (within a decade)}$$

It is further true, that the relationship of the weights of stages at decade interfaces exists:

$$\frac{\text{Weight of } Ai+1 \text{ (in decade } j)}{\text{Weight of } Ai \text{ (in decade } j-1)}=1.25$$

The cause of this disparity in these relationships is the restriction against using the six counts in each four stage decade representative of counts 10 through 15 as discussed above. It is clear that since the highest order stage in each decade is weighted at decimal 8, the lowest order stage of the next higher decade would have to be weighted at decimal 16 in order to achieve the same 2:1 rates that exist between contiguous stages within a decade. However, since the very nature of the BCD code precludes such a weighting, the ratio disparity is unavoidable.

In order to correct this factor it is necessary to modify the previously described magnitude determination technique where stage $C_m$ is of one polarity and one or more of stages $C_{m-1}$, $C_{m-2}$, ... $C_{m-n}$ are of the opposite polarity, and one or more of said opposite polarity stage is the highest order stage of a decade. Specifically, it has been found that under such conditions, shifting from lowest order stage in one decade to the second lowest order stage of the next lower decade generally produces satisfactory results. This is true because of the nature of the BCD code whereby counts representing decimal 10 through 15 are prohibited to the four binary stages in a decade. Specifically, if the highest order stage in any decade is part of the chain of $C_{m-1}$, $C_{m-2}$, etc., which require a shifting of the magnitude-determinative stage from $C_m$ to some lower order $C_1$ stage, there is a definite restriction on the states of the second and third stages of that decade. If $C_4$ is —, indicating that $A_4=0$, $B_4=1$, then $C_3$ and $C_2$ cannot possibly be — because this would require either $B_3$ or $B_2$ to be binary 1 thereby making the decimal value of the decade $B_1$ through $B_4$ greater than 9. Since the BCD code precludes this situation, it is apparent that stages 2 and 3 of the decade cannot comprise an extension of the unbroken chain of stages $Cm-1$, $Cm-2$, etc., and therefore their effect on our approximation is not as great as the effect produced by stage 4 of the decade.

The effect of this modification to our approximation technique may best be illustrated by a specific example:

EXAMPLE 5

Suppose that $C_1$ through $C_{20}$ assume the following states:

Decade 5:
    $C_{20}=0$
    $C_{19}=0$
    $C_{18}=0$
    $C_{17}=+$ (decimal $+10.000$)
Decade 4:
    $C_{16}=-$ (decimal $-08.000$)
    $C_{15}=0$
    $C_{14}=0$
    $C_{13}=-$ (decimal $-01.000$)
Decade 3:
    $C_{12}=-$ (decimal $-00.800$)
    $C_{11}=0$
    $C_{10}=0$
    $C_9=-$ (decimal $-00.100$)
Decade 2:
    $C_8=-$ (decimal $-00.080$)
    $C_7=0$
    $C_6=0$
    $C_5=-$ (decimal $-00.010$)
Decade 1:
    $C_4=-$ (decimal $-00.008$)
    $C_3=0$
    $C_2=0$
    $C_1=-$ (decimal $-00.001$)

In accordance with all of the techniques discussed above, we first determine the polarity from $C_m=C_{17}$, and find it to be $+$.

We must note that $C_m$ ($C_{17}$) and $C_{m-1}$ ($C_{16}$) are of opposite polarity, and further that $C_{16}$ is the highest order stage of decade 4. Thus we shift to the second stage of decade 4, $C_{14}$, and conditionally assign the value for $|A_{14}|$ or $|B_{14}|$ from Table 1. However, since the very next lower stage, $C_{13}$, is also of opposite polarity to $C_m$ ($C_{17}$), we shift thereto for a conditional measure of our approximate error. But it is noted that $C_{13}$ is followed by still another opposite polarity stage, $C_{12}$, and we must therefore go to that stage to provide a conditional error magnitude. However, stage $C_{12}$ is the highest order stage of decade 3, and we must therefore shift further to stage $C_{10}$, the second stage of decade 3. Once again it is noted that $C_{10}$ is followed by two stages ($C_9$, $C_8$) having polarity opposite to that of $C_m$, so we continue to shift in search of our magnitude determinative bit. Since $C_8$ is the highest order stage in decade 2 we must shift to stage $C_6$, which in turn is preceeded by stages $C_5$ and $C_4$ having opposite polarity to $C_m$. $C_4$ is the highest order stage of decade 1 so we must shift further to stage $C_2$, and since that is preceeded by stage $C_1$ which has an opposite polarity to that of $C_m$, we must go to $C_1$ as our magnitude determinative stage. Thus our error magnitude, approximated, is:

$$|C|=|A_1|=|00.001|$$

and our approximate error is $+00.001$.

As a check, it is noted that our actual error turns out to be $+00.001$.

While the approximate error in Example 5 turned out to be identical with the actual error, this is not necessarily true for all situations. For example, since the modification disregards the polarity of the second and third stages in each decade when jumping stages due to an opposite polarity condition at the highest order stage of a decade, Example 5 would have yielded the same approximate magnitude even if $C_{15}$, $C_{14}$, $C_{11}$, $C_{10}$, $C_7$, $C_6$, $C_3$, and $C_2$ were all $+$ rather than 0. However, under these conditions our actual error would be $+06.667$. Obviously, 0.001 is a rather poor approximation of 6.667, and therefore a further modification is called for. Such further modification must clearly take into consideration the effect stages 2 and 3 of each decade may have when these stages are jumped in accordance with the above-described technique. Specifically, we have seen that if stages 2 and/or 3 are of opposite polarity to stage 4, and stage 4 is part of a chain of $C_{m-1}$, $C_{m-2}$, etc. having opposite polarity to $C_m$, stage 2 or 3 must not be jumped together. It has been found that satisfactory results are achieved when the appropriate jump is made to the third stage rather than the second stage for these conditions. This is best illustrated by reconsidering the example which illustrated the need for this last-described modification:

EXAMPLE 6

Suppose that $C_1$ through $C_{20}$ assume the following states:

Decade 5:
    $C_{20}=0$
    $C_{19}=0$
    $C_{18}=0$
    $C_{17}=+$ (decimal $+10.000$)
Decade 4:
    $C_{16}=-$ (decimal $-08.000$)
    $C_{15}=+$ (decimal $+04.000$)
    $C_{14}=+$ (decimal $+02.000$)
    $C_{13}=-$ (decimal $-01.000$)
Decade 3:
    $C_{12}=-$ (decimal $-00.800$)
    $C_{11}=+$ (decimal $+00.400$)
    $C_{10}=+$ (decimal $+00.200$)
    $C_9=-$ (decimal $-00.100$)
Decade 2:
    $C_8=-$ (decimal $-00.080$)
    $C_7=+$ (decimal $+00.040$)
    $C_6=+$ (decimal $+00.020$)
    $C_5=-$ (decimal $-00.010$)
Decade 1:
    $C_4=-$ (decimal $-00.008$)
    $C_3=+$ (decimal $+00.004$)
    $C_2=+$ (decimal $+00.002$)
    $C_1=-$ (decimal $-00.001$)

In accordance with our newly modified techniques, we first determine the polarity of our error signal from $C_m=C_{17}$ and find it to be $+$.

We must note that $C_m$ ($C_{17}$) and $C_{m-1}$ ($C_{16}$) are of opposite polarity, and further that $C_{16}$ is the highest order stage of decade 4. Rather than shift to stage $C_{14}$, the second order stage of decade 4, we notice that at least one (in this case both) of stages $C_{14}$ and $C_{15}$ (stages 2 and 3 of decade 4) are of opposite polarity to $C_{16}$, and therefore we shift to stage $C_{15}$ (stage 3 of decade 4). Since the next lower stage, $C_{14}$ is not of the same polarity as the polarity of $C_{m-1}$, $C_{m-2}$, etc. (in this case $C_{16}$ alone), we do not shift any further and $C_{15}$ is the stage which determines the magnitude of our approximate error. (Note that because of the restrictions outlined above for the BCD code, stage $C_{14}$ could not possibly have the same polarity as $C_{16}$ and thus shifting would always stop at stage 3 of each decade under the situation where either stage 3 or stage 2 of any decade is of opposite polarity to stage 4 of that decade). Our approximate error magnitude as determined by $C_{15}$ is seen to be |04.000| from Table 1. Thus our approximate error is +04.000. As discussed above in conjunction with Example 5, the actual error here is +6.667, so that our approximation is reasonably close.

To best summarize the techniques discussed above, the following rules for approximating an error signal, defined as the difference between BCD signals A and B, are listed:

(1) The polarity of the error signal is the polarity of $C_m$, the highest order non-zero $C_i$ stage.

(2) If $C_{m-1}$ is zero or of the same polarity as $C_m$, the magnitude of the approximated error signal is $$|C| = |A_m|$$

where $|C|$ is the absolute value of the approximated error signal and $|A_m|$ is the absolute value indicated for $1 \leq m \leq 20$ in Table 1.

(3) If $C_m$ is immediately preceded by one or more of an unbroken chain of $n$ lower order stages $C_{m-1}$, $C_{m-2}$, ... $C_{m-n}$, having opposite polarity to $C_m$, and none of these $n$ lower order stages are the highest order stages of a decade, then the magnitude of the approximated error signal is:

$$C = A_{m-n}$$

(4) Where, as in Rule 3 an unbroken chain of $n$ lower order stages of opposite sign to $C_m$ immediately precede $C_m$, and where one of said lower order stages is the highest (fourth) order stage in a decade, and (a) where neither the second or third order stage of that decade are of opposite polarity to said fourth stage, then the magnitude of the approximated error is determined by said second stage unless the first stage of said decade is of the same polarity as said fourth stage, under which condition the magnitude is determined by reverting to Rule 3 and considering said first stage as part of the original unbroken chain of $C_{m-1}$, $C_{m-2}$, etc.

(b) where either or both of the second and third stages in said decade are of opposite polarity to said fourth stage, said third stage determines the magnitude of the approximated error signal.

It should be pointed out that Rules 1, 2, and 3 apply to the pure binary code as well as BCD, and that Rules 4(a) and 4(b) apply to only BCD. In addition, the principles employed in determining these rules are not to be considered limited to the particular codes discussed, but rather are adaptable to other codes having particular distinguishing features. The limiting consideration in this regard is that the techniques apply only to codes in which the stages are assigned weights of increasing value for ascending stage members.

As will be evident from the embodiment described below, the above described technique provides a sufficiently accurate digital comparison for many applications and eliminates the need for the expensive and complex circuitry required for rigorous direct digital subtraction techniques.

It is therefore an object of the present invention to provide a novel logic network for comparing two digital signals.

It is a further object of this invention to provide a novel logic network for approximating the difference between two digital signals with sufficient accuracy for many applications and with less complex and expensive components than was heretofore possible.

It is a further object of this invention to provide a control device wherein the difference between a fixed and a variable digital signal is approximated and said approximated difference is employed to effect an appropriate control function.

It is yet another object of this invention to provide a novel logic network for producing an error signal in digital type servomechanisms.

It is still another object of this invention to provide a position control device wherein the difference between digital position and command signal is approximated as an error signal and utilized to position a device in accordance with the command signal.

It is still another object of this invention to provide a novel numerically-controlled machine tool mechanism wherein the difference between the tool position and a command signal is approximated to produce an error signal having plural discrete ranges for driving the machine tool at plural speeds as a function of the distance of the tool from the command position.

The above and still further objects, features and advantages of the present invention will become apparent upon consideration of the following detailed description of one specific embodiment thereof, especially when taken in conjunction with the accompanying drawings, wherein:

FIGURE 2b is a schematic representation of the block diagram of FIGURE 2a;

FIGURES 4a and 4b are schematic representations of eight complete stages of a logic network employing the techniques of this invention.

It is to be understood that the embodiments of this invention can take the form of fluidic, electronic, photoelectric, magnetic or other similar circuitry and that the description below, though directed solely toward fluidic circuits, is done so for illustrative purposes only.

Figure 1:
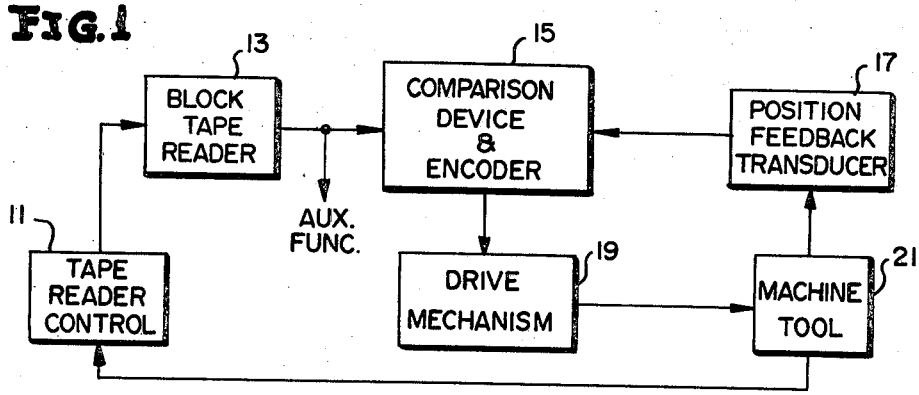
FIGURE 1 is a block diagram of a typical system in which the techniques of this invention may be employed.

Referring now to FIGURE 1, a particular system employing the logic techniques of this invention is illustrated. It must again be stressed that the logic techniques of this invention are adaptable for use in any system employing a digital comparison, however, it is described herein for illustrative purposes as utilized in a numerically controlled machine tool positioning device. Tape reader control unit 11 provides a predetermined length of tape containing position command information for one positioning cycle to the block tape reader unit 13. The tape reader control may comprise a group of logic circuits and tape feeding mechanism, both of which are conventional and form no part of this invention. The reader control 11 also verifies that the command positions of the previous positioning cycle have been reached and that various machine tool operations have been performed. The block tape reader 13 reads the command information from the block of tape as received from the reader control. In addition to providing position command information during each positioning cycle, the tape additionally contains information to control auxiliary functions, such as directing machine tool operation, and the block tape reader unit 13 distributes commands appropriately to perform these functions. The position command information is transferred to comparison device 15 in parallel form as a 20-bit binary coded decimal (BCD) word. It is to be understood that three dimensional tool positioning may be accomplished by use of three distinct digital words, each representing a positional command along a different axis. For purposes of simplification, the operation described herein deals with only one dimensional operation and one digital command word is supplied. Comparison device 15, which will be described in greater detail below, receives another 20-bit BCD signal in parallel form from position feedback transducer 17.

Transducer 17 may take the form of any appropriate device for producing a fluidic (or electronic, photoelectric, etc.) signal as a function of the position of the control device. A typical transducer for providing such a function may be found in U.S. Patent No. 3,239,142, issued Mar. 8, 1966 to G. A. Lavine. As indicated in said patent, the device or tool which is being position-controlled may rotate (wherein the signals fed to the comparison device will be angular position information) or may move rectilinearly. In either case, the information fed from transducer 17 to comparison device 15 is in BCD form. Comparison device 15 compares the two signals as received from the reader 13 and the transducer 17 to produce an error signal representative of the difference between the two signals. For predetermined differences between said signals different discrete error signal levels are produced as will be described below to activate drive mechanism 19 at respectively different speeds. Drive mechanism 19 may be any appropriate motor to perform the function of positioning machine tool 21. As machine tool 21 is driven closer to the command position by motor 19, the signal received at comparison device 15 from transducer 17 approaches the value of the command signal received by comparison device 15 from block tape reader 13. Thus the error signal output from comparison device 15 becomes smaller in discrete steps as discrete predetermined differences between the command and position signals are effected. For example, if a four speed drive is desired, the tool may be driven at 1200 inches per minute for differences between the command and position signals above a predetermined value. In the range of signal differences below said predetermined value, but above a second predetermined value, a motor speed for driving the tool at 120 inches per minute can be effected. In the range between said second predetermined value and a third predetermined value, the motor speed can be reduced to 12 inches per minute at a difference range between said third predetermined value and the difference equivalent to the positioning resolution of the system, the motor can be driven at 1.2 inches per minute. Once the difference between the command signal and the position signal reaches a value equivalent to the system resolution the motor will stop, since the tool has been positioned with the desired accuracy for purposes of this embodiment. As will be described in greater detail later, a positioning accuracy of one-one thousandth ($\frac{1}{1000}$) of an inch is required for this system as described. This should in no way be construed however as limiting the ranges of resolution for which the logic network of this invention can be utilized.

Figure 2A:
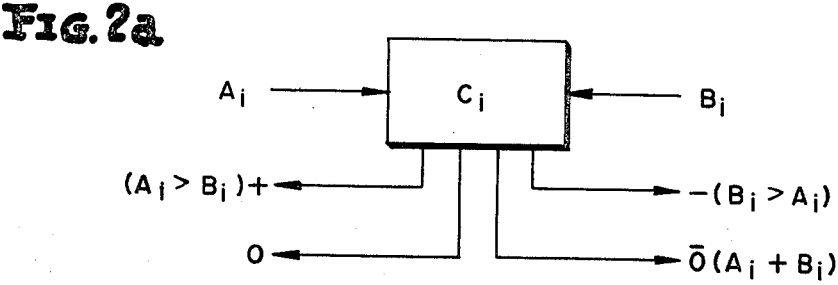
FIGURE 2a is a block diagram representing a standard comparison unit employing the logic techniques of this invention.
Figure 2B:
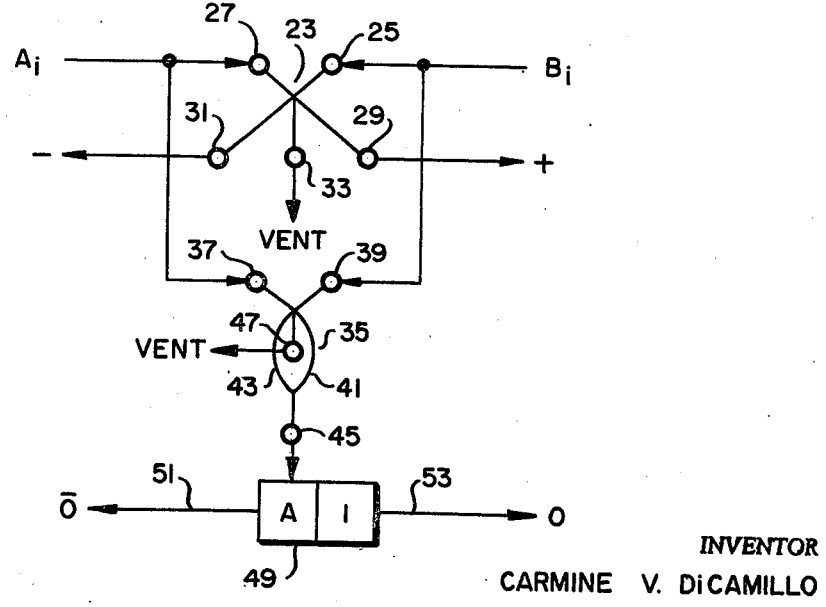

FIGURES 2a and 2b represent, respectively, a block and schematic representation of the basic circuit element used in the comparison device 15 of FIGURE 1. As seen in FIGURE 2a, comparison element $C_i$, representative of any individual comparison stage, receives an input $A_i$ and $B_i$ from the corresponding bit of the command word A at the block tape reader 13 and the position word B at the feedback transducer 17, respectively. Comparison unit $C_i$, 20 of which will be required if the A and B signals are each 20 bits long, produces four output signals: $+$, when $A_i > B_i$; $-$, when $B_i > A_i$; 0, when $A_i = B_i$; and $\bar{0}$, when $A_i \neq B_i$.

Figure 4A:
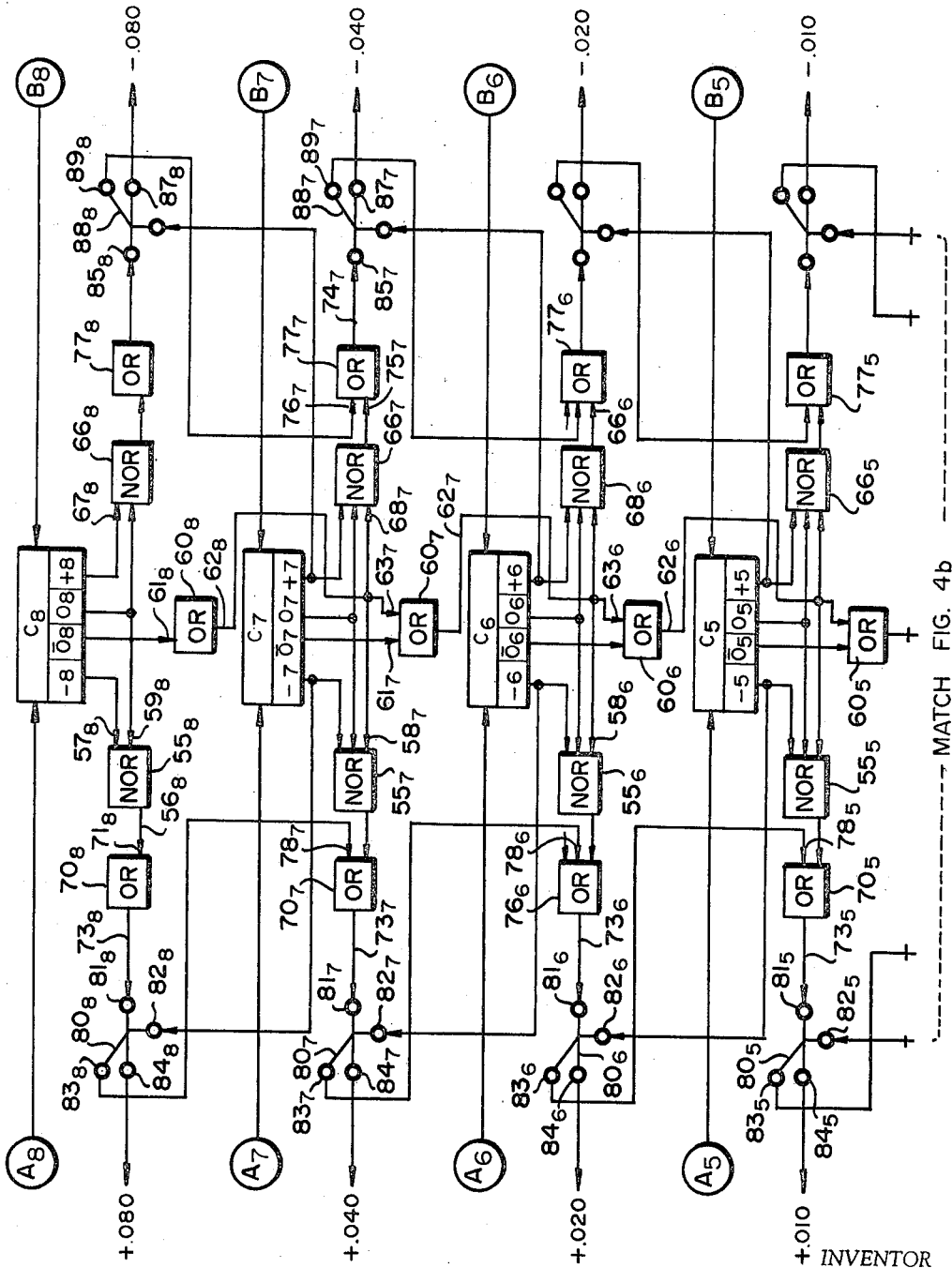

FIGURE 2b schematically illustrates the component parts of block $C_i$ and the appropriate connections for the corresponding input and output signals. As indicated signals $A_i$ and $B_i$ are fed to the two input passages 27 and 25, respectively, of fluid AND gate 23. AND gate 23 may be of the type disclosed in "Fluid Logic Device and Circuits'" by A. E. Mitchell et al., published by The Society of Instrument Technology, February 1963, FIGURE 4(a), wherein input passages A and B and output $\bar{A} \cdot B$, $A \cdot B$, and $A \cdot \bar{B}$ correspond respectively to input passages 27 and 25, and output passages 31, 33, and 29 of gate 23 herein.

For purposes of this description, a binary logic convention will be employed wherein binary one is represented by the presence of a fluid stream, and binary zero by the absence of a fluid stream. As indicated, when $A_i$ is 1 and $B_i$ is 0 a $+$ output is present at output passage 29 of the AND gate. This is so because the fluid stream representative of the binary 1 for $A_i$ is undeflected in the fluid AND gate and is thus free to proceed directly to output passage 29 which is positioned to receive such an undeflected fluid stream. Similarly, when $B_i$ is binary 1 and $A_i$ is binary 0 the fluid stream present at input terminal 25 representative of $B_i$ being binary 1 produces a $-$ output at output passage 31. When both $A_i$ and $B_i$ are binary 0 there is no fluid stream input at either of the input terminals of AND gate 23 and thus there can be no output stream at either of output passages 29 or 31. When both $A_i$ and $B_i$ are binary 1 there are equal pressure fluid streams at input passage 25 and input passage 27 which interact within the fluid AND gate to produce a resulting stream that is directed through vent passage 33. Thus, neither the $+$ nor $-$ output is energized in this condition. Inputs $A_i$ and $B_i$ are also supplied to input passages 37 and 39, respectively of fluid EXCLUSIVE OR gate 35. Fluid EXCLUSIVE OR gate 35 may be of the type disclosed in the above-referenced Mitchell et al. publication, FIG. 4(b), wherein input passages A and B, and output passages $A \cdot B$ and $A \cdot \bar{B} + \bar{A} \cdot B$ correspond respectively to input passages 37 and 39 and output passages 47 and 45 of gate 35 herein. When $A_i$ is binary 1 and $B_i$ is binary 0 a fluid stream is applied to input passage 37 and is free to flow via passage 41 to output passage 45 of the EXCLUSIVE OR gate. When $B_i$ is binary 1 and $A_i$ is binary 0 the fluid stream indicative of the binary 1 state of $B_i$ is applied to input passage 39 of the EXCLUSIVE OR gate, and is permitted to flow through passage 43 to output passage 45. When both $A_i$ and $B_i$ are binary zero, there are no fluid input streams at passages 37 and 39 and therefore no fluid output is present at the EXCLUSIVE OR gate output passage 45. When both $A_i$ and $B_i$ are binary 1 fluid streams appear at both input passages 37 and 39 of EXCLUSIVE OR gate 35. These fluid streams being of equal pressure interact within the EXCLUSIVE OR gate to form a resultant stream which is directed to vent passage 47. Thus there is no fluid stream at output passage 45 unless $A_i$ alone or $B_i$ alone are present as binary 1 inputs to the EXCLUSIVE OR gate. The output stream from passage 45 of the EXCLUSIVE OR gate 35 is fed to the input passage of amplifier-inverter 49 which may be of the type disclosed in "Fluidics," published in August 1965 by Fluid Amplifier Associates, Inc., Boston, Massachusetts, page 243, FIGURE 2 wherein control nozzle A, and output passage $\bar{A}$ and A correspond respectively to passage 45, an output passages 53 and 51 of amplifier-inverter 49 herein. The power stream which has no reference designation in the publication, is not illustrated in the schematic representation of amplifier-inverter 49 herein. A signal from output passage 45 of EXCLUSIVE OR gate 35 acts to deflect the power stream (not illustrated) applied to amplifier-inverter 49 to output passage 51 so as to produce a $\bar{0}$ signal. Thus, any time $A_i$ or $B_i$, but not both, are binary 1 there is a signal indicating such at output passage 51. In the absence of the fluid stream from output passage 45 to amplifier-inverter 49, the power stream is normally directed as a 0 signal to output passage 53 indicating that $A_i$ and $B_i$ are either both binary 0 or both binary 1 and hence both equal. Thus, it is seen that four output signals from the block $C_i$ in FIGURE 2a can be simply and readily implemented using the three fluid logic elements, AND gate 23, EXCLUSIVE OR gate 35 and amplifier-inverter 49.

Figures 3, 5:
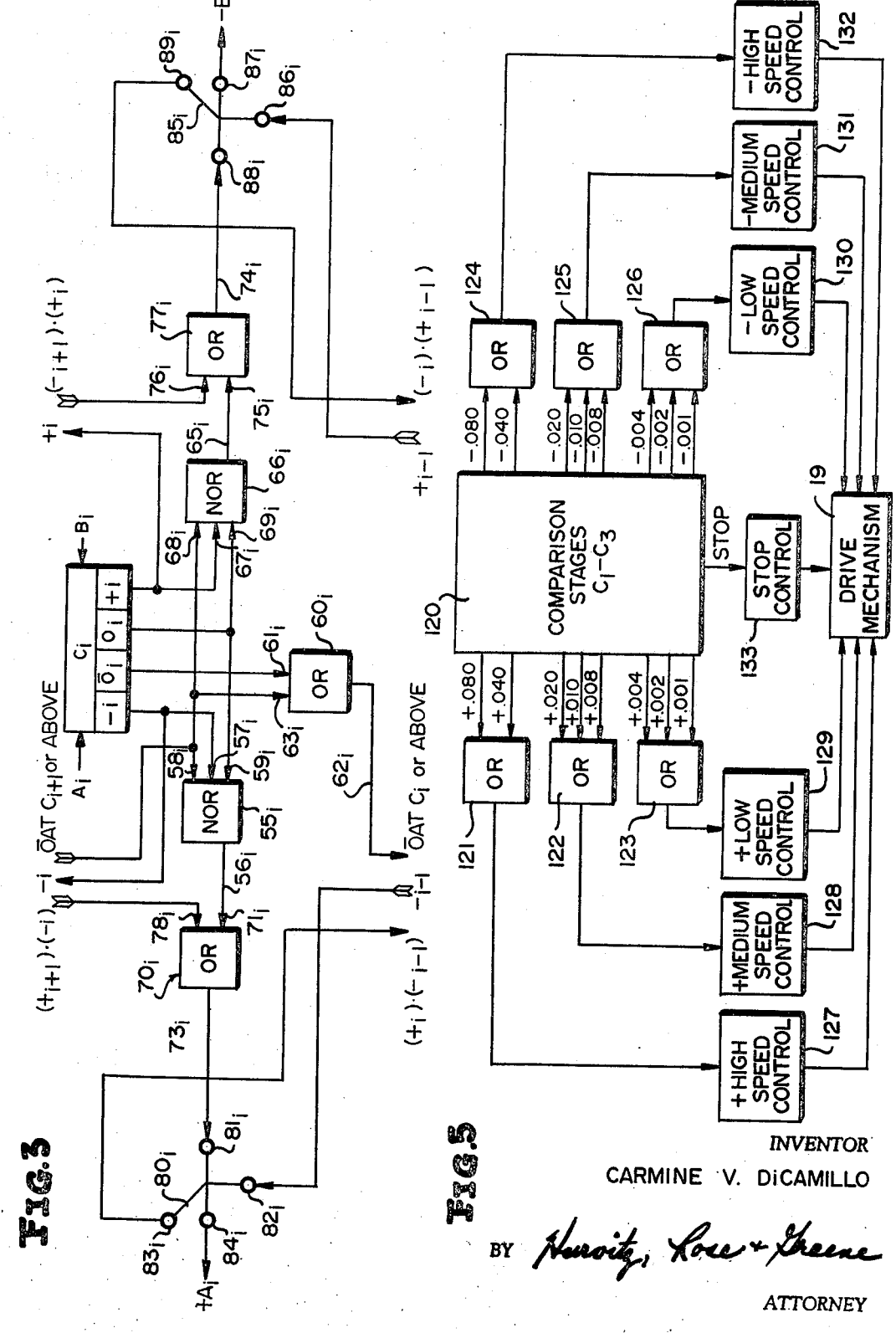
FIGURE 3 is a schematic representation of one complete comparison stage of a logic network employing the techniques of this invention.
FIGURE 5 is a schematic representation illustrating how the output signals from the network of FIGURE 4 are utilized.

FIGURE 3 is a schematic representation of a complete stage of comparison and encoding device 15 of FIGURE 1, wherein the comparison circuit of FIGURE 2a and associated encoding logic are illustrated. The complete stage shown in FIGURE 3 is the general stage $i$ for comparison and encoding device 15, and consequently the input and output signals described as associated with stage $C_i$ in FIGURE 2a appear at the various input and output passages of this stage. The $-_i$ output signal is fed to input passage $57_i$ of fluid NOR gate $55_i$. This fluid NOR gate may be of the type illustrated in FIGURE 1 of U.S. Patent 3,240,219 to E. M. Dexter and D. R. Jones, wherein control passage $57_i$ and $58_i$ of FIGURE 3 herein, and further wherein an additional control nozzle is provided as described in column 9, lines 30–34 to correspond to input passage $59_i$ herein. In addition output passage 19 of FIGURE 1 of said patent corresponds to output passage $56_i$ of NOR gate $55_i$ of FIGURE 3 herein, and power nozzle 15 of FIGURE 1 of said patent is not illustrated in the schematic representation of gate $55_i$ herein. In addition, the $-_i$ output is fed to the $C_{i+1}$ stage as an indication that $B_i > A_i$ where it serves a function which will subsequently be described. The $+_i$ output signal of comparison unit $C_i$ is fed to input passage $67_i$ of fluid NOR gate $66_i$. NOR gate $66_i$ is preferably of the same type as NOR gate $55_i$. In addition, the $+_i$ output signal from comparison unit $C_i$ is fed to the $C_{i+1}$ stage where it too serves a function which will subsequently be described. The $0_i$ output of the $C_i$ unit is fed to input passages $59_i$ and $69_i$ of fluid NOR gates $55_i$ and $66_i$, respectively. The $\bar{0}_i$ is fed to input passage $61_i$ of fluid OR gate $60_i$. Fluid OR gate $60_i$ may be of the type described in FIGURE 1 of the aforementioned U.S. Patent 3,240,219 to E. M. Dexter and D. R. Jones wherein control nozzles 16 and 17 correspond to input passages $61_i$ and $63_i$ herein respectively and wherein output passage 20 corresponds to output passage $62_i$ herein. The power nozzle 15 of said patent is not illustrated in the schematic representation of OR gate $60_i$. It is to be understood that additional control nozzles may be added to OR gates of this type in accordance with the description in column 9, lines 30–34 of the Dexter et al. patent. A $\bar{0}_{i+1}$ signal from stage $C_{i+1}$ is applied to input passages $58_i$ and $68_i$ of fluid NOR gates $55_i$ and $66_i$, respectively, and is also applied to input passage $63_i$ of OR gate $60_i$. This signal indicates that a non-zero condition exists for some stage of higher order than $C_i$ and is received directly at stage $C_i$ from an output passage $62_{i+1}$ (not shown) of the stage $C_{i+1}$ which corresponds to output passage $62_i$ of OR gate $60_i$ in stage $C_i$.

An output signal at NOR gate output passage $56_i$ is passed to input passage $71_i$ of fluid OR gate $70_i$. In addition an output signal at NOR gate output passage $65_i$ of fluid NOR gate $66_i$ is presented as an input signal at input passage $75_i$ of fluid OR gate $77_i$. Fluid OR gate $70_i$ and fluid OR gate $77_i$ are preferably of the same type as fluid OR gate $60_i$ described above. An additional input signal to fluid OR gate $70_i$ is provided from the $C_{i+1}$ stage to input passage $78_i$ and is present when $C_{i+1}$ is positive ($+_{i+1}$) and $C_i$ is negative ($-_i$). An output signal from fluid OR gate $70_i$ appears at output passage $73_i$. Similarly, fluid OR gate $77_i$ receives an additional input signal at input passage $76_i$, this signal also being provided from the $C_{i+1}$ stage and representing the condition that $C_{i+1}$ is negative ($-_{i+1}$) and $C_i$ is positive ($+_i$). The output signal from fluid OR gate $77_i$ appears at output passage $74_i$. The output signals at output passages $73_i$ and $74_i$ are passed to the respective input passages $81_i$ and $88_i$ of respective conditional logic gates $80_i$ and $85_i$. Conditional logic gates $80_i$ and $85_i$ may be of the type described in FIGURE 1 of the aforementioned U.S. Patent No. 3,240,219 to E. M. Dexter and D. R. Jones, wherein power nozzle 15, control nozzle 16, output passage 20, and output passage 21 correspond to input passages $81_i$ and $82_i$ and output passages $83_i$ and $84_i$ respectively. For this application of the Dexter et al. logic gate, control nozzle 17 is not employed and may be vented or sealed off as desired. Output passage $84_i$ of fluid OR gate $80_i$ is disposed to receive an undeflected fluid input stream at input passage $81_i$. Similarly, output passage $87_i$ of fluid OR gate $85_i$ is disposed to receive an undeflected fluid input stream applied at input passage $88_i$. An additional input signal $-_{i-1}$ from the $C_{i-1}$ stage is applied to input passage $82_i$ of conditional gate $80_i$. This signal is present when $B_{i-1} > A_{i-1}$. Input passage $82_i$ is disposed such that an input stream applied thereto deflects an input stream appearing at input passage $81_i$ of conditional logic gate $80_i$ to form a resultant output stream directed towards output passage $83_i$. The output stream at output passage $83_i$ is fed to input passage $78_{i-1}$ of the $C_{i-1}$ stage, corresponding substantially to the input passage at $78_i$ of OR gate $70_i$ in the $C_i$ stage. In like manner an additional input signal is applied to conditional logic gate $85_i$ at input passage $86_i$. This input signal emanates from stage $C_{i-1}$ and is present when $A_{i-1} > B_{i-1}$. The fluid signal at input passage $86_i$ is normally directed to deflect a fluid input stream appearing at input passage $88_i$ to output passage $89_i$ of conditional logic gate $85_i$. The output signal from output passage $89_i$ is applied to the $C_{i-1}$ stage at an input passage $76_{i-1}$ (not shown) of an OR gate $77_{i-1}$ (not shown) so as to correspond to the input signal appearing at input terminal $76_i$ of OR gate $77_i$ in the $C_i$ stage.

It is to be noted that output signal $+A_i$ at output passage $84_i$ and output signal $-B_i$ at output passage $87_i$ represent the system output signals from the $C_i$ stage. That is, one of these signals will be present when the logic conditions, to be described in detail below, prescribe that the $C_i$ stage determines the magnitude of the approximated error signal produced by comparison device and encoder 15 of FIGURE 1.

FIGURE 4 is schematic illustrating eight stages of comparison device and encoder unit 15. Only two decades (eight stages) are illustrated in order to simplify the description of the device, it being understood that the remaining three decades (twelve stages) or more if necessary in particular applications are similarly interconnected and operate identically. It is readily seen that each of the eight illustrated stages is substantially the same as stage $C_i$ illustrated in FIGURE 3. Where appropriate in the description that follows, reference numerals employed in FIGURE 3 are associated with similar elements in FIGURE 4, but include a numerical subscript representative of the particular stage with which the element belongs in place of the $i$ subscript employed in FIGURE 3.

The first mode of operation to be described is concerned with Rules (1) and (2) outlined above and provides for the determination of the polarity and approximate magnitude of the difference between command signal A and position signal B when the highest order non-zero $C_i$ stage is not immediately preceded by lower order stages of opposite polarity. Initially, the highest order non-zero $C_i$ stage ($C_m$) generates a signal which inhibits certain logic circuits associated with all of the lower order $C_i$ stages. For example, if signals $A_8$ and $B_8$ at comparison stage $C_8$ are not equal, the $\bar{0}_8$ output signal will be energized. This signal appears at input passage $61_8$ of OR gate $60_8$. OR gate $60_8$ produces an output when any of its input passages are energized, so that in our example an output signal appears at output passage $62_8$. The signal from passage $62_8$ is passed to stage 7 where it is applied at input passages $58_7$, $68_7$ and $63_7$ of NOR gate $55_7$, NOR gate $66_7$ and OR gate $60_7$, respectively. NOR gates operate so as to produce an output signal only when none of their input passages are energized. Thus, the signal from ouput passage $62_8$ serves to inhibit both NOR gates $55_7$ and $66_7$. In addition the signal at output passage $62_8$ activates OR gate $60_7$ via input passage $63_7$ so as to produce a signal at output passage $62_7$. The output signal at passage $62_7$ is in turn passed to stage 6 where it is applied to input passages $58_6$ and $68_6$ of NOR gates $55_6$ and $66_6$ respectively, thereby inhibiting these NOR gates. In addition, the signal from passage $62_7$ is applied to input passage $63_6$ of OR gate $60_6$ to produce an output signal or OR gate output passage $62_6$. The signal appearing at passage $62_6$ may be traced further on through all lower order stages where it inhibits the NOR gates 55 and 66 and activates OR gates 60 of these stages in a manner identical to that described for stages 6 and 7. It is to be noted that OR gate $60_7$ may be activated by an input signal at input passage $61_7$ whenever $A_7 \neq B_7$ so as to produce a $\overline{0}_7$ signal, and also that OR gate $60_6$ may be activated by an input signal at input terminal $60_6$ whenever $A_6 \neq B_6$ to produce signal $\overline{0}_6$. Since the same relationship holds true in every stage, it is clear that an inequality of input signals $A_i$ and $B_i$ at any stage $C_i$ produces an output signal $\overline{0}_i$ which acts to inhibit the NOR gates $55_{i-1}{}^1$; $55_{i-1}{}^2$, etc. . . . $55_{i-i+1}{}^1$ and $66_{i-1}$; $66_{i-2}$ etc. . . . $66_{i-i+1}$ associated with all stages of lower order than $C_i$. Thus, a stage 8 inequality inhibits the NOR gates in stages 7 through 1, a stage 7 inequality inhibits the NOR gates in stages 6 through 1, etc. Therefore, only the highest order non-zero $C_i$ stage will have a NOR gate ($55_i$ or $66_i$) which is not inhibited. In view of this, therefore, if we assume in our illustrative example that $A_8$=binary 1, $B_8$=binary 0, the $+_8$ signal is produced and NOR gate $55_8$ will be the only one of NOR gates $55_i$ and $66_i$ (all stages) to provide an output signal. This is so because all of these NOR gates in stages 7 through 1 are inhibited as described above, because NOR gate $66_8$ is inhibited by the $+_8(A_8>B_8)$ signal applied at input passage $67_8$, and because neither $-_8(B_8>A_8)$ nor the $0_8(A_8=B_8)$ is present at input passages $57_8$ and $59_8$ respectively to inhibit NOR gate $55_8$. Consequently an output signal is present at output passage $56_8$ of NOR gate $55_8$, and is applied as an input signal to input passage $71_8$ of OR gate $70_8$. OR gate $70_8$ is activated thereby to produce an output signal at output passage $73_8$ which is in turn passed to input passage $81_8$ of conditional logic gate $80_8$. In the absence of a signal at input passage $82_8$ of this gate, which for purposes of this example we assume to be the case, the signal at passage $81_8$ produces a signal at output passage $84_8$, which in turn provides the +.080 output signal. The absence of a signal at input passage $82_8$ of conditional logic gate $80_8$ is based on the assumed condition that stage $C_7$ is not of the opposite polarity to stage $C_8$, and therefore the signal $-_7$ is not produced by stage $C_7$. System operation for conditions when this signal is present will be described in detail below. For purposes of this example, however, the +.080 signal is the only system output signal for the logic network. This may be better appreciated by considering the following conditions which exist. Each of NOR gates $66_1$ through $66_8$ are inhibited as described above, thereby precluding input signals to OR gates $77_1$ through $77_8$ via these NOR gates. In addition, since OR gate $77_8$ has only one input passage, and since this passage is not energized by a signal, OR gate $77_8$ produces no output signal, and consequently provides no input signal at input passage $85_8$ of the conditional logic gate $88_8$. With no input signal at input passage $85_8$ there can never be an output signal at either of output passages $87_8$ and $89_8$ of conditional logic gate $88_8$. The absence of an output signal at output passage $87_8$ precludes the existence of −.080 system output signal. Further, the absence of an output signal at output passage $89_8$ prevents energization of input passage $76_7$ of OR gate $77_7$. As input passage $75_7$ of OR gate $77_7$ is similarly unenergized, there is no signal at output passage $74_7$ of OR gate $77_7$. Thus, there can be no input signal to input passage $85_7$ of conditional logic gate $88_7$ and consequently neither output passage $87_7$, $89_7$ of gate $88_7$ is energized. Absence of a signal at passage $87_7$ precludes the presence of the 0.040 system output signal, and absence of a signal at passage $89_7$ operates to preclude − output signals at stages 1 through 6 in a manner similar to that in which the absence of a signal at passage $89_8$ has been illustrated to preclude the presence of the −.040 signal. Similarly, the presence of system output signals +.001 through +.040 is precluded so long as the $-_7(B_7>A_7)$ signal is not produced at stage 7 ($C_{m-1}$ is not of opposite polarity to $C_m$). Thus OR gates $70_1$ through $70_7$ receive no input signals from their associated inhibited NOR gates $55_1$ through $55_7$ respectively or from the output passage $83_1$ of the next higher order stages.

Since for $A_8>B_8$, +.080 is the energized system output signal for the example described above, the approximated error, as obtained from $A_8$ in Table 1, is +00.080, irrespective of the states of stages $C_1$ through $C_6$ and provided $C_7$ is not in the − state ($B_8>A_8$).

The next mode of operation to be described concerns Rule 3 outlined above and provides for the correction of the error signal whenever the highest order non-zero $C_i$ stage ($C_m$) is of a different polarity than one or more of the immediately preceding lower order $C_i$ stages. For purposes of this description, assume $A_8$=binary 1, $B_8$=binary 0 as above. Considering NOR gate $55_8$ in stage 8 it is seen that the input signals at passages $57_8$ and $59_8$, $-_8$ and $0_8$, respectively, are not present and therefore NOR gate $55_8$ produces signal at output passage $56_8$. On the other hand, the only output signal from unit $C_8$ is $+_8$ which indicates that $A_8$ is greater than $B_8$. The signal at output passage $56_8$ activates OR gate $70_8$ to produce a signal at input passage $81_8$ of conditional logic gate $80_8$ in the manner described above. If we assume now that stage $C_{m-1}$ ($C_7$) is of opposite polarity to stage $C_m$ ($C_8$) then $B_7>A_7$ and the $-_7$ signal is supplied by stage $C_7$ to input passage $82_8$ of gate $80_8$. Such a signal deflects the fluid signal from input passage $81_8$ towards output passage $83_8$, removing the output signal from passage $84_8$. Thus the change in polarity from stage $C_m$ ($C_8$) to $C_{m-1}$ ($C_7$) results in a signal which inhibits the +.080 signal even though $A_8>B_8$. We may now define the logic conditions for output passages $84_8$ and $83_8$ of conditional logic gate $80_8$ as follows:

(a) There is no output at either of passages 84 or 83 when $A_8$ is not greater than $B_8$.

(b) If $A_8>B_8$ and $B_7$ is not greater than $A_7$ there is a +.080 output signal at passage $84_8$ indicating that the magnitude of signal C is the magnitude of $A_8$ unconditionally (following Rule 2).

(c) If $A_8>B_8$ and $B_7>A_7$ then no output signal exists at passage $84_8$ and $A_8$ does not control the magnitude of signal C. Rather, $A_7$ conditionally controls the magnitude of signal C and this is indicated by the signal present at $83_8$ (following Rule 3).

The output signal at output passage $83_8$ is fed to stage 7 at input passage $78_7$ of OR gate $70_7$ to produce an output signal at output passage $73_7$ which is applied to input passage $81_7$ of conditional logic gate $80_7$, thereby priming conditional logic gate $80_7$ to produce a +.040 system output signal at passage $84_7$, as long as no $-_6$ input signal is received from $C_6$ at passage $82_7$. As was explained above for input terminal $82_8$ of conditional logic gate $80_8$, there is an input signal to passage $82_7$ only when the $B_6$ input signal to the next lower order stage $C_6$ is greater than the $A_6$ input signal to that stage. When the $-_6$ signal is present there is no output signal at passage $84_7$, but rather there is an output signal at output passage $83_7$, such signal being fed to OR gate $70_6$ to in turn provide an input signal at input passage $81_6$ of conditional logic gate $80_6$. Thus, a change in polarity between $C_m$ (the highest order non-zero $C_i$ bit stage and $C_{m-1}$ removes magnitude determination control from $C_m$ and places such control in $C_{m-1}$ or some lower order stage if the polarity of $C_{m-1}$ persists in said lower order stages. This overall operation may be best understood by referring to a specific example.

EXAMPLE 7

Let $A_8>B_8$; $B_7>A_7$; $B_6>A_6$; $A_5=B_5$.

From Rule 3 of our general rules promulgated above it is apparent that the magnitude of the C error signal should be controlled by stage 6 while the polarity should be determined by stage 8 and is in the A (or +) direction. Checking our circuit to see that this is in fact implemented, we see that the $+_8$ signal appearing at input passage $67_8$ inhibits NOR gate $66_8$. The $0_8$ output signal of stage $C_8$ is not present and the $-_8$ output signal of $C_8$ is not present, therefore NOR gate $55_8$ is not inhibited and a signal exists at output passage $56_8$. This signal activates OR gate $70_8$, which in turn provides a signal to input terminal $81_8$ of conditional logic gate $80_8$. In addition, the $\bar{0}_8$ output of stage $C_8$ is applied to OR gate $60_8$ to produce an output signal at passage $62_8$. As described above, this signal, in conjunction with the various OR gates 60 in stages 2–8, operates to inhibit NOR gates 55 and 56 in each of the stages 1–7. Stage 7 inputs $A_7$ and $B_7$ are such that $B_7 > A_7$ according to our hypothesis. Thus while the output signals of stage $C_7$ are blocked by inhibited NOR gates $55_7$ and $66_7$, the $-_7$ output signal from stage $C_7$ appears at input terminal $82_8$ of conditional logic gate $80_8$ in stage $C_8$. The fluid input stream at input $81_8$ is deflected thereby to output passage $83_8$ and appears at passage $78_7$ of OR gate $70_7$ in stage 7. The OR gate output signal appears as an input signal at input passage $81_7$ of conditional logic gate $80_7$. Since $B_6$ is greater than $A_6$ there is also a $-_6$ signal generated from stage $C_6$ which appears at input passage $82_7$ of the stage 7 conditional logic gate $80_7$. This signal acts to deflect the fluid stream input at input passage $81_7$ towards output passage $83_7$. The output signal from passage $83_7$ is applied at input passage $78_6$ of OR gate $70_6$ in stage 6. OR gate $70_6$ is thus activated to produce a signal at input passage $81_6$ of conditional logic gate $80_6$. Under our hypothesis $A_5 = B_5$ and therefore the $-_5$ output signal of unit $C_5$ is not energized and no input signal appears at input terminal $82_6$ of conditional logic gate $80_6$. Thus the fluid signal appearing at input terminal $81_6$ is free to pass to output passage $84_6$, thereby providing a +.020 system output signal which determines the magnitude and polarity of the approximate error signal.

In order to demonstrate how the system of FIGURE 4 conforms to the requirements of Rule 4 when one of $C_{m-1}$, $C_{m-2}$, etc. is the highest order stage in a decade, Example 8 is presented.

EXAMPLE 8

Assume $A_8 > B_8$; $B_7 > A_7$; $B_6 > A_6$; $B_5 > A_5$; $B_4 > A_4$.

These conditions bring us to a point similar to that existing under the above described Example 7 wherein a signal appears at input passage $81_6$ of conditional logic gate $80_6$. However, in the present example, since $B_5 > A_5$ signal $-_5$ is generated at stage $C_5$ and appears at input terminal $82_6$ of stage 6 to deflect the fluid stream appearing at passage $81_6$ from passage $84_6$ towards output passage $83_6$ thereby removing the +.020 system output signal from output passage $84_6$. The signal at output passage $83_6$ is applied to OR gate $70_5$ in stage 5 at input passage $78_5$. Thus energized, OR gate $70_5$ produces a signal at output passage $73_5$ which is applied to input passage $81_5$ of conditional logic gate $80_5$. Since according to our given conditions $B_4 > A_4$, a $-_4$ signal is produced by stage $C_4$ and is applied to $82_5$ of conditional logic gate $80_5$ to deflect the signal present at input passage $81_5$ towards output passage $83_5$. It is to be noted that stage $C_4$ is the highest order stage in the decade determined by stages $C_1$ through $C_4$ and that stage $C_5$ would have been the stage determining the magnitude of the error signal (+.010 system output signal) had there been no $-_4$ signal generated at stage $C_4$. Thus, the chain of stages $C_{m-1}$, $C_{m-2}$, etc. which immediately precede the highest order nonzero stage $C_m$ ($C_8$) and are opposite in polarity thereto, include the highest order stage ($C_4$) of a decade (decade 1). According to Rule 4 promulgated above, such a condition should result in a shift to the second ($C_2$) or third ($C_3$) highest order stage of that decade depending on the state of these stages. First let us assume that both $C_2$ and $C_3$ are 0 ($A_2 = B_2$; $A_3 = B_3$). Under these conditions, the signal at output passage $83_5$ is connected to input passage 101 of OR-NOR gate 100.

OR-NOR gate 100 may be of the type illustrated in FIGURE 1 of U.S. Patent 3,240,219 to E. M. Dexter and D. R. Jones, wherein power nozzle 15, control nozzles 16 and 17, and output passages 19 and 20 correspond respectively to input passages 101, 102, and 103 and output passages 104 and 105 of gate 100. This gate operates such that a signal at input passage 101 appears at output passage 104 when neither of input passage 102 and 103 has a signal applied thereto. If a signal is applied to either of passages 102 or 103, the signal from input passage 101 is deflected towards output passage 105. Input passage 102 is connected to receive a $+_2$ signal from stage $C_2$ and input passage 103 is connected to receive a $+_3$ signal from stage $C_3$. Since we have assumed $A_2 = B_2$ and $A_3 = B_3$, neither of the $+_2$ or $+_3$ signals is present and the input signal at input passage 101 is permitted to pass undeflected to output passage 104 of OR-NOR gate 100. In accordance with Rule 4(a), the output signal from passage 104 is applied to stage $C_2$ to OR gate $70_2$ at input passage 72 to activate said gate and produce an output signal at output passage $73_2$. This signal is in turn passed to input passage $81_2$ of conditional logic gate $80_2$. Operation then continues as described above as though stage $C_2$ were a part of the unbroken chain of stages $C_{m-1}$, $C_{m-2}$, etc. having opposite polarity to $C_m$. Thus, if a $-_1$ signal is produced at stage $C_1$ ($B_1 > A_1$), the signal at passage $81_2$ is deflected towards output passage $83_2$ which in turn activates OR gate $70_1$ to produce a +.001 system output signal thereby making stage $C_1$ the magnitude-determinative stage. On the other hand, if the $-_1$ signal is not present, the signal at passage $81_2$ is not deflected and a +.002 system output signal from stage $C_2$ results.

If, in the above example, instead of having $C_2 = 0$ and $C_3 = 0$ there had been a + signal produced at one or both of these stages, slightly different results would have ensued. This will be explained by assuming that stage $C_3$ produce a $+_3$ signal ($A_3 > B_3$), and describing system operation therefor. Initially it must be pointed out that if a $-_4$ signal is produced by stage $C_4$ ($B_4 > A_4$), neither $C_3$ nor $C_2$ can be in the $-$ state since either condition would call for the first decade of the B signal (stages $B_1$ through $B_4$) to have a value greater than decimal 9. Thus, when $C_4$ is $-$, $C_3$ and $C_2$ can only be in the + or 0 states. Returning to our example, if $C_3$ produces a $+_3$ signal ($A_3 > B_3$), a signal appears at input passage 103 of OR-NOR gate 100 and deflects the signal at input passage 101 to remove the signal from passage 104 and to produce an output signal at output passage 105. (The same result would have ensued if $C_2$ were in the + state, the deflecting signal, $+_2$, appearing at passage 102; and similarly the same result would ensue if both $C_3$ and $C_2$ were in the + state, the deflecting signals $+_2$ and $+_3$ appearing respectively at passages 102 and 103.) The output signal at passage 105 is applied to input passage 79 of OR gate $70_3$ in stage $C_3$ in accordance with the requirements of Rule 4(b). This serves to activate OR gate $70_3$, producing an output signal at output passage $73_3$ which is applied to input passage $81_3$ of conditional logic gate $80_3$. As explained above, under the conditions assumed for this example wherein stage $C_4$ is $-$, the $-_2$ signal can never be produced at stage $C_2$ and consequently there can never be a signal at passage $82_3$ to deflect the signal appearing at passage $81_3$. Thus, as required by Rule 4(b), the system output signal is +.004. The operation described in the preceeding examples in which the polarity of the highest order non-zero $C_1$ stage was positive follows in identical fashion when the highest order non-zero $C_1$ stage is negative. This is true because all of the circuitry on the left side of FIGURE 4 has identical counterparts on the right side of the figure, and the counterpart circuitry takes control over system operation for a negative error signal. Therefore, to avoid repetition, operation of the system for a negative difference between A and B will not be described.

The next mode of operation to be described concerns the condition when the command signal A and the position signal B are equal. It is to be noted from FIGURE 3 that the $0_i$ output signal of stage $C_i$ acts to inhibit NOR gates $55_i$ and $66_i$. Thus, when all of the bits in the B signal become equal to respective bits in the A signal, all of the C stages will produce 0 output signals which inhibit respective associated NOR gates 55 and 66, thereby preventing generation of any of the system output signals $+.001$ through $+.080$ and $-.001$ through $-.008$. Another result of all of the B bits becoming equal to all of the A bits is that none of the $\overline{0}$ signals are generated in any of the stages. Thus, none of the OR gates $60_2$ through $60_8$ are activated and the NOR gate 110 associated with stage $C_1$ receives no input signal. NOR gate 110 is preferably identical to NOR gates $55_1$ and $66_1$. With no input signals applied to inhibit NOR gate 110, a STOP output signal appears at passage 111 to stop the drive mechanism or motor 19 of FIGURE 1.

It is to be understood that while FIGURE 4 and the detailed operational description therefor relate to a two-decade, eight stage system, the operation of a three, four, five or more decade system is substantially the same. The interconnections within each decade for larger systems are identical to those shown in FIGURE 4. Connections between decades for larger systems are substantially the same as shown in FIGURE 4, it being understood that OR-NOR gate 100, illustrated as associated with the first decade, is required for all decades except the highest order decade.

The standard comparison unit of FIGURES 2a and 2b and utilized as element $C_i$ in FIGURE 4 may be comprised of the Digital Comparator device disclosed in my co-pending application Ser. No. 499,782, entitled "Digital Comparator," filed Oct. 21, 1965, and assigned to the same assignee as the instant invention.

FIGURE 5 schematically illustrates one possible manner of employing the system output signals generated in the system of FIGURE 4 to provide discrete ranges of speed control for drive mechanism 19 of FIGURE 1. Comparison block 120 represents the system of FIGURE 4 with the various system output signals ($+.001$ through $+.080$ and $-.001$ through $-.080$) grouped arbitrarily as input signals to various OR gates 121 through 126. It is to be understood that the particular signal grouping illustrated in FIGURE 5 is meant to be representative only, and that any grouping or number of groups may be employed insofar as they define meaningful error signal ranges. For example, one would not group the $+.002$ signal with the $+.040$ and $+.080$ signal, etc. Thus, as illustrated, signals $+.080$ and $+.040$ are the input signals for OR gate 121, signals $+.020$, $+.010$, and $+.008$ are the input signals for OR gate 122, signals $+.004$, $+.002$, and $+.001$ are the input signals for OR gate 123, signals $-.080$, and $-.040$ are the input signals for OR gate 124, signals $-.020$, $-.010$, and $-.008$ are the input signals for OR gate 125 and signals $-.004$, $-.002$ and $-.001$ are the input signals for OR gate 126. OR gates 121 through 126 are preferably of the same type as OR gate $60_i$ of FIGURE 3. The output signals from the OR gates 121–126 are connected to respective speed control devices 127 through 132 which in turn provide signals to drive mechanism 19. In addition, the STOP signal produced by NOR gate 110 of FIGURE 4 is connected to a stop control device 133, which in turn provides a signal to drive mechanism 19. The nature of control devices 127 through 132 depends on the nature of drive mechanism 19. For example, if drive mechanism 19 is a motor which operates at various speeds in either direction as a function of magnitude and polarity of electrical signals, control devices 127 through 132 may be fluid to electrical transducers. Or, if drive mechanism 19 is fluid operated, the control devices may be fluid amplifiers. In any case, control devices 127 through 132 must be capable of producing different signals which are recognizable at the drive mechanism as commands to operate at different speeds and directions as necessary. Thus, if comparison block provides an approximate error signal $+.080$ or $+.040$, OR gate 121 is activated and in turn activates $+$ high speed control device 127. Control device 127 produces a signal which commands high speed operation of drive mechanism 19 in the $+$ direction. In like manner, the various other output signals energize their associated OR gates and speed control devices such that the drive mechanism operates at high, medium, or low speed in either the $+$ or $-$ direction as a function of the approximate error output signal from comparison block 120.

Whenever the STOP output signal is energized, stop control device 133 is activated to produce a signal which provides a braking function at drive mechanism 19. As is the case for control devices 127 through 132, the nature of control device 133 depends on the nature of drive mechanism 19. All that is required of control device 133 is that it produce a signal which is recognizable at the drive mechanism as a braking command.

What has been described above is merely one of the many possible embodiments of the novel concepts of this invention. Further, the utilization of fluid circuitry in the above described embodiments should not be construed as limiting, since clearly the various logic elements of FIGURES 2, 3, 4 and 5 are well known in electronics and other fields.

While I have described and illustrated one specific embodiment of my invention, it will be clear that variation of the details of construction which are specifically illustrated and described may be resorted to without departing from the true spirit and scope of the invention.

I claim:

1. A logic nework for approximating the difference between two digital signals, each signal having a plurality of binary digits and each signal employing the same binary-type code, said binary-type code being such that all digits in each signal are assigned different decimal equivalent weights, said network comprising:

a plurality of comparison means for simultaneously and individually comparing the binary states of respective pairs of digits of equal weight and for individually providing indications of non-zero differences between said pairs of digits of equal weights and indications of the polarity of said non-zero difference;

logic means connected to said comparison means for providing an indication of the polarity of the difference between said two digital signals in accordance with the polarity of the difference between the compared pair of digits having the highest weight and having a non-zero difference, said logic means additionally providing an indication of the approximate magnitude of the difference between said digital signals in accordance with the weight of the compared pair of digits having the highest weight and having a non-zero difference;

correction means connected to said logic means and comparison means for inhibiting said approximate magnitude indication and providing a modified approximate magnitude indication in accordance with the weight of said next lower weighted pair of digits only when the difference between the highest-weighted pair of digits having a non-zero difference is of one polarity and the difference between the next lower weighted pair of digits is of opposite polarity, said correction means additionally including means for providing a further modified approximate magnitude indication in place of said modified approximate magnitude indication only when additional consecutive pairs of compared digits having weights immediately lower than said next lower weighted pair having differences of said opposite polarity, said further modified approximate magnitude indication being provided in accordance with the weight of the lowest weighted one of said additional consecutive pairs of digits having said opposite difference polarity; and wherein said binary-type code is a binary coded decimal code wherein said digital signals comprise at least eight digits so as to represent the equivalent of at least two decades, and wherein said logic network further comprises: additional correction means for inhibiting said further modified approximate magnitude indication and for providing in its place a corrected approximate magnitude indication only when one of a group of pairs of digits comprising said next lower weighted pair and said additional consecutive pairs include the highest weighted pair in any decade.

2. The logic network of claim 1 wherein said additional correction means includes:

means for providing said corrected approximate magnitude indication in accordance with the weight of the third highest weighted pair of digits in said any decade only when the differences between either said third highest weighted pair of digits or between the second highest weighted pair of digits in said any decade are of the same polarity as the polarity of the difference between said highest weighted pair of digits having a non-zero difference;

further means for providing said corrected approximate magnitude indication in accordance with the weight of said second highest weighted pair of digits in said any decade only when the difference between neither said third nor said second highest weighted pairs of digits in said any decade is of the same polarity as the polarity of the difference between said highest weighted pair of digits having a non-zero difference;

means for inhibiting the corrected approximate magnitude indication provided by said further means and for providing a different corrected approximate magnitude indication only when the lowest weighted pair digits in said any decade has said opposite difference polarity.

3. A logic network for comparing two digital signals A and B, each employing a binary-type code, said signals defined by the expressions $$A = \sum_{i=1}^{n} A_i$$

and $$B = \sum_{i=1}^{n} B_i$$

respectively wherein $A_i$ and $B_i$ represent any one of $n$ binary stages in respective ones of signals A and B, and wherein the weight assigned to each stage in said signals increases for increasing the values of $i$, and wherein equal weights are assigned to corresponding $A_i$ and $B_i$, said network comprising:

$n$ comparison means for making $n$ individual comparisons between the binary states of $A_i$ and $B_i$ to produce a plurality of signals $C_i$ for representing the expression $C_i = A_i - B_i$ for each of said states wherein the weights assigned to $A_i$ and $B_i$ are assigned to $C_i$ and its respective comparison means;

logic circuit means connected to said $n$ comparison means for providing a signal $C_m$ representing the highest-weighted of the non-zero $C_i$ signals at any instant of time;

conditional logic means connected to said logic circuit means and comparison means for:

(1) providing a logic network output signal representative of the polarity and weight of signal $C_{m-1}$, the $C_i$ signal having the next lower weight than $C_m$, is either zero or of the same polarity as $C_m$; and (2) inhibiting the network output signal representative of the polarity and weight of signal $C_m$ when signal $C_{m-1}$ is of opposite polarity to signal $C_m$ and providing a network output signal having the polarity of signal $C_m$ and the weight of signal $C_{m-x}$, where $C_{m-x}$ represents the lowest-weighted $C_i$ signal of a sequence of $x$ consecutively lower weighted signals of $C_m$ having said opposite polarity;

wherein said $C_i$ signals produced at each comparison means comprise:

(a) a signal, $+_i$, indicating that $A_i > B_i$;
(b) a signal, $-_i$, indicating that $B_i > A_i$;
(c) a signal, $0_i$, indicating that $A_i = B_i$; and
(d) a signal, $\bar{0}_i$, indicating that $A_i \neq B_i$;

and wherein said logic circuit means comprises:

$n-1$ OR gates associated respectively with all but the lowest weighted comparison means;

$2n$ pairs of NOR gates, each pair associated with a respective one of said $n$ comparison means;

means for connecting an output signal from each NOR gate to said conditional logic means;

means for connecting the $\bar{0}_i$ signal produced by all but lowest weighted comparison means an an input signal to the respective OR gate associated with that comparison means;

means for providing an additional input signal to the OR gates associated with all but the highest order comparison means from the output signal of the OR gate associated with the respective next higher weighted comparison means;

means for connecting the output signals of each of said OR gates as input signals to both NOR gates of the pair associated with the respective next lower weighted comparison means to inhibit each pair of NOR gates associated with a comparison means having a lower weight than the highest weighted comparison means producing a $\bar{0}_i$ signal.

4. The logic network of claim 3 wherein said logic circuit means further comprises:

means for connecting the $0_i$ signal produced by each comparison means as an input signal to both of the pair of NOR gates associated with that comparison means;

and means for connecting the $-_i$ signal produced by each comparison means as an input signal to a first of the pair of NOR gates associated with that comparison means, and for connecting the $+_i$ signal produced by each comparison means as an input signal to a second of the pair of NOR gates associated with that comparison means;

whereby no more than one of all of said NOR gates is permitted to provide an input signal to said conditional logic means at any instant of time, said one of all of said NOR gates being associated with the highest weighted comparison means producing a $\bar{0}_i$ signal.

5. The logic network of claim 4 wherein said conditional logic means comprises:

$2n$ pairs of OR gates, each pair associated with a respective one of said $n$ comparison means;

$2_{(n-1)}$ pairs of conditional logic gates, each pair associated with a respective one of the $(n-1)$ highest weighted comparison means, each of said conditional logic gates having a first and second input means and a first and second output means, said first output means providing a first output signal only when an input signal is applied to said first input means and no signal is applied to said second input means, and said second output means providing a second output signal only when input signals are applied to both of said first and second input means;

means for connecting an output signal from the first of each of said pairs of NOR gates as an input signal to a first of the pair of OR gates associated with the same comparison means;

means for connecting an output signal from the second of each of said pairs of NOR gates to a second of the pair of OR gates associated with the same comparison means;

means for connecting an output signal from the first of the ($n-1$) highest weighted of said pairs of OR gates as an input signal to the first input means of the first of the pair of conditional logic gates associated with the same comparison means;

means for connecting an output signal from the second of the ($n-1$) highest weighted of said pairs of OR gates as an input signal to the first input means of the second of the pair of conditional logic gates associated with the same comparison means;

means for connecting the $-_1$ signal produced by the ($n-1$) lowest weighted comparison means as an input signal to the second input means of the first of the pair of conditioned logic gates associated with the respective next higher weighted comparison means;

means for connecting the $+_1$ signal produced by the ($n-1$) lowest weighted comparison means as an input signal to the second input means of the second of the pair of conditional logic gates associated with the respective next higher weighted comparison means;

and means for connecting each of the second output means of all of said conditional logic gates to provide network output signals.

6. The network of claim 5 wherein said conditional logic means further comprises:

means for connecting an output signal from said second output means of the first of each of said pairs of conditional logic gates as an input signal to the first of the pair of OR gates associated with the next lower weighted comparison means;

means for connecting an output signal from said second output means of the second of each of said pairs of conditional logic gates as an input signal to the second of the pair of OR gates associated with the next lower weighted comparison means.

7. The network of claim 5 wherein said binary-type code is a binary-coded-decimal code having four digits representing each decade and wherein $n$ has a value of at least eight, said conditional logic means further comprising:

a pair of OR-NOR gates associated with all but the highest order decade, each of said OR-NOR gates comprising first, second, and third input means and first input means for providing an output signal only when an input signal is present at said first input means and no input signals are present at either of said second and third input means, and a second output means for providing an output signal only when an input signal is present at said first input means and an input signal is present at at least one of said second and third input means;

means for connecting an output signal from the second output means of the first of each of those pairs of conditional logic gates which are associated with the second, third and fourth highest weighted comparison means of each decade as an input signal to the first of each of the pair of OR gates associated with the next lower weighted comparison means;

means for connecting an output signal from the second output means of the second of each of those pairs of conditional logic gates which are associated with the second, third and fourth highest weighted comparison means of each decade as an input signal to the second of each of the pair of OR gates associated with the next lower weighted comparison means;

means for connecting an output signal from the second output means of the first of each pair of conditional logic gate which is associated with the lowest weighted comparison means in all decades except the lowest order decade as an input signal to the first input means of the first of the pair of OR-NOR gates associated with the next lower order decade;

means for connecting an output signal from the second output means of the second of each pair of conditional logic gates which is associated the lowest weighted comparison means in all decades except the lowest order decade as an input signal to the first input means of the second of the pair of OR-NOR gates associated with the next lower order decade;

means for connecting the $+_1$ signal produced by the third highest weighted comparison means of each respective decade except the highest order decade as an input signal to the second input means of the first of the pair of OR-NOR gates associated with the same respective decade;

means for connecting the $-_1$ signal produced by the third highest weighted comparison means of each respective decade except the highest order decade as an input signal to the second input means of the second of the pair of OR-NOR gates associated with the same respective decade;

means for connecting the $+_1$ signal produced by the second highest weighted comparison means of each respective decade except the highest decade as an input signal to the third input means of the first of the pair of OR-NOR gates associated with the same respective decade;

means for connecting the $-_1$ signal produced by the second highest weighted comparison means of each respective decade except the highest decade as an input signal to the third input means of the second of the pair of OR-NOR gates associated with the same respective decade;

means for connecting a signal provided at the first output means of the first of each pair of OR-NOR gates as in input signal to the first of the pair of OR gates associated with the second lowest weighted comparison means in the decade with which the respective OR-NOR gate is associated;

means for connecting a signal provided at the first output means of the second of each pair or OR-NOR gates as an input signal to the second of the pair of OR gates associated with the second lowest weighted comparison means in the decade with which the respective OR-NOR gate is associated;

means for connecting a signal provided at the second output means of the first of each pair of OR-NOR gates as an input signal to the first of the pair of OR gates associated with the second highest weighted comparison means in the decade with which the respective OR-NOR is associated;

means for connecting a signal provided at the second output means of the second of each pair of OR-NOR gates as an input signal to the second of the pair of OR gates associated with the second highest weighted comparison means in the decade with which the respective OR-NOR gate is associated.

8. The network of claim 7 wherein each of said $n$ comparison means comprises:

logic gate means having first and second input means and first and second output means for providing a first output signal at said first output means only when an input signal is present at said first input means and no signal is present at said second input means and for providing a second output signal at said second output means only when an input signal is present at said second input means and no signal is present at said first input means;

EXCLUSIVE OR gate means having first and second input means and an output means for providing an output signal when onlp one of said first and second input means receives an input signal;

means for connecting a signal representative of the binary state of $A_i$ to the first input means of both said logic gate means and said EXCLUSIVE OR gate means;

means for connecting a signal representative of the binary state of $B_i$ to the second input means of both said logic gate means and said EXCLUSIVE OR gate means;

amplifier-inverter means comprising one input means, a first output means for providing a first output signal only when a signal is present at said one input means, and a second output means for providing a second output signal only when no signal is present at said one input means;

means for connecting the output means of said EXCLUSIVE OR gate means to the one input means of said amplifier-inverter means;

whereby, the first output means of said logic gate means provides the $+_i$ signal, the second output means of said logic gate means provides the $-_i$ signal, the first output means of said amplifier-inverter provides the $\bar{0}_i$ signal, and the second output means of said amplifier-inverter means provides the $0_i$ signal.

9. The network of claim 8 wherein digital signal A represents a command position with respect to an arbitrary zero position of a device which is to be position-controlled, and wherein digital signal B represents the actual position of said device, said network further comprising:

a variable speed drive mechanism for controlling the position of said device;

signal conversion means connected to the first output means of all of said conditional logic gates and connected to said drive mechanism for driving said drive mechanism at a plurality of different speeds in accordance with the presence of a signal at predetermined ones of said first output means of said conditional logic gates;

whereby said device is automatically positoned in accordance with said command position.

10. The combination of claim 9 wherein said device to be position-controlled is a machine tool.

11. The combination of claim 10 wherein said two digital signals are fluid signals and wherein said comparison means, said logic circuit means, said conditional logic means, and said OR-NOR gates comprise pure fluid elements.

12. The network of claim 5 wherein each of said $n$ comparison means comprises:

logic gate means having first and second input means and first and second output means for providing a first output signal at said first output means only when an input signal is present at said first input means and no signal is present at said second input means and for providing a second output signal at said second output means only when an input signal is present at said second input means and no signal is present at said first input means;

EXCLUSIVELY OR gate means having first and second input means and an output means for providing an output signal when only one of said first and second input means receives an input signal;

means for connecting a signal representative of the binary state of $A_i$ to the first input means of both said logic gate means and said EXCLUSIVE OR gate means;

means for connecting a signal representative of the binary state of $B_i$ to the second input means of both said logic gate means and said EXCLUSIVE OR gate means;

amplifier-inverter means comprising one input means, a first output means for providing a first output signal only when a signal is present at said one input means, and a second output means for providing a second output signal only when no signal is present at said one input means;

means for connecting the output means of said EXCLUSIVE OR gate means to the one input means of said amplifier-inverter means;

whereby, the first output means of said logic gate means provides the $+_i$ signal, the second output means of said logic gate means provides the $-_i$ signal, the first output means of said amplifier-inverter provides the $\bar{0}_i$ signal, and the second output means of said amplifier-inverter means provides the $0_i$ signal 13. The network of claim 12 wherein digital signal A represents a command position with respect to an arbitrary zero position of a device which is to be position-controlled, and wherein digital signal B represents the actual position of said device, said network further comprising:

a variable speed drive mechanism for controlling the position device;

signal conversion means connected to the first output means of all of said conditional logic gates and connected to said drive mechanism for driving said drive mechanism at a plurality of different speeds in accordance with the presence of a signal at predetermined ones of said first output means of said conditional logic gates;

whereby said device is automatically positioned in accordance with said command position.

14. The combination of claim 13 wherein said device to be position-controlled is a machine tool.

15. The combination of claim 14 wherein said two digital signals are fluid signals and wherein said comparison means, said logic circuit means and said conditional logic means comprise pure fluid elements.

16. The combination of claim 13 wherein said signal conversion means comprises:

a plurality of output OR gates each having connected thereto a different plurality of said first output means of said conditional logic gates;

a plurality of control means, each connected to receive an output signal from a different one of said output OR gates, and each responsive to a respective output OR gate signal to provide a different level signal;

means connecting the different level signal from each of said control means to said drive mechanism for driving said drive mechanism at a direction and speed determined by signals present at the first output means of said conditional logic gates.

17. A position control system for positioning a device in accordance with a command signal, said command signal having a binary format comprising a plurality of increasingly weighted bits, said system comprising:

variable speed drive means responsive to individual ones of a plurality of input signals for moving said device at a corresponding plurality of individual velocities;

transducer means for providing a position signal representing the actual position of said device, said position signal having the same binary format as said command signal wherein each bit in said command signal has a corresponding equally weighted bit in said position signal;

comparison means for simultaneously and individually comparing the binary states of equally weighted bits in said command and position signals and for providing individual indications of non-zero differences between said equally weighted bits and indications of the polarity of said non-zero differences;

logic means responsive to said comparison means for providing an indication of the polarity of the difference between said command and position signals in accordance with the polarity of the difference between the equally weighted bits having the highest weight and a non-zero difference, said logic means additionally providing an indication of the approximate magnitude of the difference between said command and position signals in accordance with the weight of the equally weighted bits having the highest weight and a non-zero difference;

correction means responsive to said logic means and comparison means for inhibiting said approximate magnitude indication and providing a modified approximate magnitude indication only when the difference between the highest-weighted pair of equally weighted bits having a non-zero difference is of one polarity and the difference between the next lower weighted pair of equally weighted bits is of opposite polarity; and control means responsive to said approximate magnitude indication and said modified approximate magnitude indication for applying said plurality of input signals to said variable speed drive means, said plurality of input signals being accorded respective weights representing respective ranges of differences between said command and position signals.

18. The system of claim 17 wherein said correction means comprises means for providing said modified approximate magnitude indication in accordance with the weight of the said next lower weighted pair of equally weighted bits.

19. The system of claim 18 wherein said correction means includes means for providing a further modified approximate magnitude indication in place of said modified approximate magnitude indication only when additional consecutively weighted pairs of equally weighted bits having weights immediately lower than said next lower weighted pair have differences of said opposite polarity, said further modified approximate magnitude indication being provided in accordance with the weight of the lowest weighted pair, one of said additional consecutively weighted pairs of equally weighted bits having said opposite difference polarity, and wherein said control means is additionally responsive to said further modified approximate magnitude indication.

20. The system of claim 19 wherein said binary format is a binary coded decimal code, wherein said command and position signals comprise at least eight bits each so as to represent the equivalent of at least two decades, said system further comprising:

additional correction means for inhibiting said further modified approximate magnitude indication and for providing in its place a corrected approximate magnitude indication only when one of a group of pairs of equally weighted bits comprising said next lower weighted pair and said additional consecutively weighted pairs include the highest weighted pair in any decade.

21. A position control system for positioning a device in accordance with a command signal A, said command signal having a bianry format defined by the following expression $$A = \sum_{i=1}^{n} A_i$$

where $A_i$ represents any one of $n$ binary bits in command signal A, wherein the weight accorded each bit in signal A increases for increasing values of $i$, said system comprising:

variable speed drive means responsive to individual ones of a plurality of input signals for moving said device at a corresponding plurality of individual velocities;

transducer means for providing a position signal B representing the actual position of said device, said position signal having the same binary format as said command signal A and defined by $$B = \sum_{i=1}^{n} B_i$$

where $B_i$ represents any one of $n$ binary bits in position signal B, and wherein equal weights are accorded corresponding $A_i$ and $B_i$ bits;

$n$ comparison means for making $n$ individual comparisons between the binary states of $A_i$ and $B_i$ to produce a plurality of signals $C_i$ representing the expression $C_i = A_i - B_i$ for each of said states wherein the weights assigned to $A_i$ and $B_i$ are assigned to $C_i$ and its respective comparison means;

logic circuit means connected to said $n$ comparison means for providing a signal $C_m$ representing the highest-weighted of the non-zero $C_i$ signals;

conditional logic means responsive to said logic circuit means and comparison means for:

(a) providing a first logic signal representative of the polarity and weight of signal $C_m$ when signal $C_{m-1}$, the $C_i$ signal having the next lower weight than $C_m$, is either zero or of the same porality as $C_m$; and (b) inhibiting said first logic signal when signal $C_{m-1}$ is of opposite polarity to signal $C_m$ and providing a second logic signal having the polarity of signal $C_m$ and the weight of signal $C_{m-x}$, where $C_{m-x}$ represents the lowest-weighted $C_i$ signal of a sequence of $x$ consecutively lower weighted signals of $C_m$ having said opposite polarity; and control means responsive to said first and second logic signals for applying said plurality of input signals to said variable speed drive means, said plurality of input signals being accorded respective weights representing respective ranges of difference between command signal A and position signal B.

22. The system of claim 21 wherein said $C_i$ signals produced at each comparison means comprise:

(a) a signal, $+_i$, indicating that $A_i > B_i$;
(b) a signal, $-_i$, indicating that $B_i > A_i$;
(c) a signal, $0_i$, indicating that $A_i = B_i$; and
(d) a signal, $\overline{0_i}$, indicating that $A_i \neq B_i$;

and wherein said logic circuit means comprises:

$n-1$ OR gates associated respectively with all but the lowest weighted comparison means;

$2n$ pairs of NOR gates, each pair associated with a respective one of said $n$ comparison means;

means for connecting an output signal from each NOR gate to said conditional logic means;

means for connecting the $\overline{0_i}$ signal produced by all but the lowest weighted comparison means as an input signal to the respective OR gate associated with that comparison means;

means for providing an additional input signal to the OR gates associated with all but the highest order comparison means from the output signal of the OR gate associated with the respective next higher weighted comparison means;

means for connecting the output signals of each of said OR gates as input signals to both NOR gates of the pair associated with the respective next lower weighted comparison means to inhibit each pair of NOR gates associated with a comparison means having a lower weight than the highest weighted comparison means producing a $\overline{0}_i$ signal.

References Cited

UNITED STATES PATENTS 2,923,476  2/1960  Ketchledge _____ 235—177

EUGENE G. BOTZ, Primary Examiner

U.S. Cl. X.R.

90—13; 235—151.11; 318—20